US008751505B2

(12) United States Patent
Carmel et al.

(10) Patent No.: US 8,751,505 B2
(45) Date of Patent: Jun. 10, 2014

(54) INDEXING AND SEARCHING ENTITY-RELATIONSHIP DATA (75) Inventors: David Carmel, Haifa (IL); Haggai Roitman, Yoknea'm Elit (IL); Sivan Yogev, Givat Haim Meuchad (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/417,248

(22) Filed: Mar. 11, 2012

(65) Prior Publication Data
US 2013/0238631 A1 Sep. 12, 2013

(51) Int. Cl.
G06F 7/00 (2006.01)
G06F 17/30 (2006.01)

(52) U.S. Cl.
USPC .......................................................... 707/742

(58) Field of Classification Search
USPC ................. 705/7.14, 321; 707/694, 765, 781; 709/223, 224; 714/4.11, 6.3
See application file for complete search history.

(56) References Cited

U.S. PATENT DOCUMENTS

| | | | |
|---|---|---|---|
| 6,847,980 B1 * | 1/2005 | Benitez et al. | 707/741 |
| 6,976,018 B2 | 12/2005 | Teng et al. | |
| 7,314,951 B2 * | 1/2008 | Rivers et al. | 560/155 |
| 7,730,014 B2 * | 6/2010 | Hartenstein et al. | 707/713 |
| 7,873,973 B2 | 1/2011 | Knudson et al. | |
| 8,019,752 B2 | 9/2011 | Ferrari et al. | |
| 2004/0024790 A1 * | 2/2004 | Everett | 707/200 |
| 2004/0225629 A1 * | 11/2004 | Eder | 706/46 |
| 2005/0267871 A1 * | 12/2005 | Marchisio et al. | 707/3 |
| 2006/0026189 A1 * | 2/2006 | Djugash et al. | 707/102 |
| 2006/0149710 A1 * | 7/2006 | Koningstein et al. | 707/3 |
| 2006/0195460 A1 * | 8/2006 | Nori et al. | 707/100 |
| 2006/0235870 A1 | 10/2006 | Musgrove | |
| 2007/0038610 A1 * | 2/2007 | Omoigui | 707/3 |
| 2007/0055680 A1 * | 3/2007 | Statchuk | 707/100 |
| 2007/0078889 A1 * | 4/2007 | Hoskinson | 707/102 |
| 2009/0100053 A1 * | 4/2009 | Boschee et al. | 707/6 |
| 2009/0144609 A1 * | 6/2009 | Liang et al. | 715/230 |
| 2009/0327225 A1 * | 12/2009 | Parra et al. | 707/3 |
| 2009/0327271 A1 * | 12/2009 | Amitay et al. | 707/5 |
| 2010/0070448 A1 * | 3/2010 | Omoigui | 706/47 |
| 2010/0299372 A1 * | 11/2010 | Djugash et al. | 707/805 |
| 2011/0078136 A1 | 3/2011 | Ronen et al. | |
| 2011/0178974 A1 | 7/2011 | Sayal et al. | |

(Continued)

OTHER PUBLICATIONS

Aditya et al., "Banks: browsing and keyword searching in relational databases". In Proceedings of VLDB, pp. 1083-1086, VLDB Endowment, 2002.

(Continued)

*Primary Examiner* — Robert W. Beausoliel, Jr.
*Assistant Examiner* — Nicholas Allen (57) ABSTRACT

Method, system, and computer program product for indexing and searching entity-relationship data are provided. The method includes: defining a logical document model for entity-relationship data including: representing an entity as a document containing the entity's searchable content and metadata; dually representing the entity as a document and as a category; and representing each relationship instance for the entity as a category set that contains categories of all participating entities in the relationship. The method also includes: translating entity-relationship data into the logical document model; and indexing the entity-relationship data of the populated logical document model as an inverted index. The method may include searching indexed entity-relationship data using a faceted search, wherein the categories are all categories required for supporting faceted navigation.

25 Claims, 7 Drawing Sheets

(56) References Cited

U.S. PATENT DOCUMENTS

| | | | |
|---|---|---|---|
| 2011/0191347 A1* | 8/2011 | Maddali et al. | 707/741 |
| 2011/0191349 A1 | 8/2011 | Ford et al. | |
| 2011/0238651 A1* | 9/2011 | Glazer et al. | 707/706 |
| 2011/0295853 A1* | 12/2011 | Li et al. | 707/736 |
| 2011/0295911 A1* | 12/2011 | DeWoolfson | 707/803 |
| 2012/0109966 A1* | 5/2012 | Liang et al. | 707/740 |
| 2012/0158633 A1* | 6/2012 | Eder | 706/46 |
| 2012/0158714 A1* | 6/2012 | Dumant | 707/728 |
| 2012/0166443 A1* | 6/2012 | Bloesch et al. | 707/740 |
| 2012/0233127 A1* | 9/2012 | Solmer et al. | 707/661 |
| 2012/0331013 A1* | 12/2012 | Vickers et al. | 707/804 |

OTHER PUBLICATIONS

Hristidis and Papakonstantinou, "Discover: keyword search in relational databases", In Proceedings of VLDB, pp. 670-681, VLDB Endowment, 2002.

Coffman and Weaver, "Structured data retrieval using cover density ranking", In Proceedings of the Workshop on Keyword Search on Structured Data, pp. 1:1-1:6, ACM, 2010.

Guo et al., "Xrank: ranked keyword search over xml documents", In Proceedings of SIGMOD, pp. 16-27, ACM, 2003.

Lei et al., "SemSearch: A Search Engine for the Semantic Web", EKAW 2006, LNCS (LNAI), vol. 4248, pp. 238-245, 2006.

Zhou et al., "Spark: adapting keyword query to semantic search", In Proceedings of ISWC/ASWC, pp. 694-707, Springer-Verlag, 2007.

W3C Recommendation, SPARQL Query Language for RDF, Jan. 15, 2008 URL: http://www.w3.org/tr/rdf-sparql-query/.

Halevy et al., "Answering queries using views", In Proceedings of PODS, pp. 95-104, 1995.

Bast and Weber, "Type less, find more: fast Autocompletion search with a succinct index", In Proceedings of SIGIR, pp. 364-371. ACM, 2006.

Cao et al., "Context-aware query suggestion by mining click-through and session data", In Proceeding of SIGKDD, pp. 875-883. ACM, 2008.

Daniel Tunkelang, "Faceted Search", Morgan & Claypool Publishers, 2009.

Garcia-Alvarado et al., "Olap-based query recommendation", In Proceedings of CIKM, pp. 1353-1356, ACM, 2010.

Roy et al., "Minimum-effort driven dynamic faceted search in structured databases", In Proceeding of CIKM, pp. 13-22, ACM, 2008.

Zenz et al., "From keywords to semantic queries-incremental query construction on the semantic web", Web Semant, vol. 7, Issue 3, pp. 166-176, Sep. 2009.

Balog et al., "Overview of the TREC 2009 entity track", In Proceedings of TREC, 2009.

Balog et al., "Entity search: building bridges between two worlds", In Proceedings of SEMSEARCH, pp. 9:1-9:5, ACM, 2010.

Kasneci et al., "Naga: Searching and ranking knowledge", In Proceedings of ICDE, pp. 953-962, IEEE Computer Society, 2008.

Weikum et al., "Database and information-retrieval methods for knowledge discovery", communications of the ACM, vol. 52, No. 4, pp. 56-64, Apr. 2009.

Jeh and Widom, "SimRank: a measure of structural-context similarity", In Proceedings of SIGKDD, pp. 538-543, ACM Press, 2002.

Chakrabarti et al., "Ranking objects based on relationships", In Proceedings of SIGMOD, pp. 371-382, ACM, 2006.

Koren et al., "Measuring and extracting proximity in networks", In Proceedings of SIGKDD, ACM, pp. 245-255, New York, NY, USA, 2006.

Cheng et al., "Entityrank: searching entities directly and holistically", In Proceedings of VLDB, pp. 387-398, VLDB Endowment, 2007.

Zhao et al., "P-rank: a comprehensive structural similarity measure over information networks", In Proceeding of CIKM, ACM, pp. 553-562, New York, NY, USA, 2009.

Ori Ben-Yitzhak et al., "Beyond basic faceted search", W SDM'08, Feb. 11-12, 2008, Palo Alto, California, USA. Copyright 2008 ACM.

* cited by examiner

INDEXING AND SEARCHING ENTITY-RELATIONSHIP DATA

BACKGROUND

This invention relates to the field of entity-relationship (ER) data. In particular, the invention relates to indexing and searching entity-relationship data.

Data complexity and its diversity have been rapidly expanding over the last years, spanning from large amounts of unstructured and semi-structured data to semantically rich available knowledge. Increasing demands for sophisticated discovery capabilities over rich entity-relationship (ER) data are now being imposed by numerous applications in various domains such as social-media, healthcare, telecommunication, e-commerce and web analytics, business intelligence, cyber-security, etc.

Many useful facts about entities (e.g. people, locations, organizations, products) and their relationships can be found in multitude semi-structured and structured data sources such as Wikipedia (http://wikipedia.org), Linked Data cloud (http://linkeddata.org), Freebase (http://freebase.com), and many others. Yet, many of these facts are hidden behind barriers of language constraints, data heterogeneity, ambiguity, and the lack of proper query interfaces.

Therefore, discovery methods are required to provide highly expressive discovery capabilities over large amounts of entity-relationship data, which are intuitive for end-users.

ER discovery approaches can be classified according to two main user-centric aspects, namely the type of queries they support (termed query type hereinafter) and the amount of user involvement in the discovery process (termed query execution hereinafter).

Query types range from free-text queries to fully structured queries. Free-text queries allow end-users a simple way to express their information needs independently from the underlying data model and structure, as well as from a specific query language. On the other hand, structured query languages such as SQL for relational data, XQuery for XML, and SPARQL for RDF data, allow users to submit queries that may precisely identify their information needs, but often require users to be familiar with formal logic representation and with the underlying ontology and data structure.

Query execution ranges from one-shot queries to iterative queries. A one-shot query is executed once by the system without supporting additional user involvement. Therefore, the search system is solely responsible for satisfying the user's information needs. Inspired by interactive information retrieval, where end-users can interactively refine their queries whenever their initial information need is not satisfied, iteration-supporting systems allow a sequence of query refinements through user involvement during the iterative querying process.

BRIEF SUMMARY

According to a first aspect of the present invention there is provided a computer-implemented method for indexing and searching entity-relationship data performed by a computerized device, comprising: defining a logical document model for entity-relationship data including: representing an entity as a document containing the entity's searchable content and metadata; dually representing the entity as a document and as a category; and representing each relationship instance for the entity as a category set that contains categories of all participating entities in the relationship; translating entity-relationship data into the logical document model; and indexing the entity-relationship data of a populated logical document model as an inverted index.

According to a second aspect of the present invention there is provided a computer program product for indexing and searching entity-relationship data, the computer program product comprising: a computer readable non-transitory storage medium having computer readable program code embodied therewith, the computer readable program code comprising: computer readable program code configured to: define a logical document model for entity-relationship data including: representing an entity as a document containing the entity's searchable content and metadata; dually representing the entity as a document and as a category; and representing each relationship instance for the entity as a category set that contains categories of all participating entities in the relationship; translate entity-relationship data into the logical document model; and index the entity-relationship data of a populated logical document model as an inverted index.

According to a third aspect of the present invention there is provided a system for indexing and searching entity-relationship data, comprising: a processor; an indexing system including: a model defining component for defining a logical document model for entity-relationship data including: representing an entity as a document containing the entity's searchable content and metadata; dually representing the entity as a document and as a category; and representing each relationship instance for the entity as a category set that contains categories of all participating entities in the relationship; an entity-relationship data translating component for translating entity-relationship data into the logical document model; and an indexing component for indexing the entity-relationship data of a populated logical document model as an inverted index.

According to a fourth aspect of the present invention there is provided a method of providing a service to a customer over a network for access control for indexing and searching entity-relationship data, the service comprising: defining a logical document model for entity-relationship data including: representing an entity as a document containing the entity's searchable content and metadata; dually representing the entity as a document and as a category; and representing each relationship instance for the entity as a category set that contains categories of all participating entities in the relationship; translating entity-relationship data into the logical document model; and indexing the entity-relationship data of a populated logical document model as an inverted index.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The described indexing and searching method belongs to the class of interactive structured queries, as it supports facet search together with graph navigation. In addition, a flexible query language is described that follows the incremental querying paradigm, spanning from free-text to structured queries. During an exploratory query session, the described method discloses only entities and relationships that are likely to be relevant to the user, according to previous queries, thus enabling effective data exploration.

An exploratory approach over ER data is described which combines the advantages of existing discovery approaches along the two aspects. Users may express their initial information need using a wide range of queries, spanning from simple free-text queries to more structured constraints over entity properties and their relationships with other entities. This allows utilization of a single search system to query entities and their relationships by both expert users and end-users who are neither familiar with the query language nor the data model.

The described method for indexing and searching ER data may be for ER data with or without schema definitions. Translating ER data into a logical document model as described herein may be with or without using schema definitions.

An extended faceted search solution is described for indexing and searching entity-relationship data in which each entity is dually represented as a searchable document and as a category of all other entities it relates to. Thus, the categories of retrieved entities enable browsing over the ER graph. However, dual representation supports only binary relationships. For example, a bookmark relationship in a social bookmarking system captures three entities involved in any bookmarking event: the tagged document, the tagger, and the tag. Such relationships are usually expressed using three different binary relationships.

In this disclosure, a generalized solution is provided which enables the capture of arbitrary n-ary relationships by representing each relationship instance in the system as a category set that contains the categories of all participating entities. This representation is required when searching for specific relationship instances, for example, the collection of tags used by a specific person to bookmark a specific document.

In this disclosure, the ER data which may be consumed may be complex in nature. The ER data may include arbitrary relationship cardinality (i.e. n-ary relationships may be indexed) and rich relationship context (i.e. attributes on relationships may be indexed). The ER data may include entity data with multiple attributes of various data types, and relationship data with arbitrary cardinality, and attributes on relationships denoting relationship context.

The output of the search system is a ranked list of entities that match the user query. Similarly to traditional faceted search systems, the system may provide a distribution of retrieved entities over the facets they belong to, including facets of various entity types, properties, and related entities. The user in turn may exploit such facets to focus the search on a specific entity type or attribute, or to explore another direction by navigating to another related entity in the ER graph.

Whenever the user chooses to either filter the current result set based on some facet or to follow related entities using a relationship facet, the user query may be automatically refined to reflect her choice using structured query predicates, while releasing the user from the need of understanding the underlying query language. On each iterative query step, similarly to traditional faceted search systems, the system provides the user with a useful report on facet distributions, revealing the number of sub-results expected for each facet choice.

Figure 1:
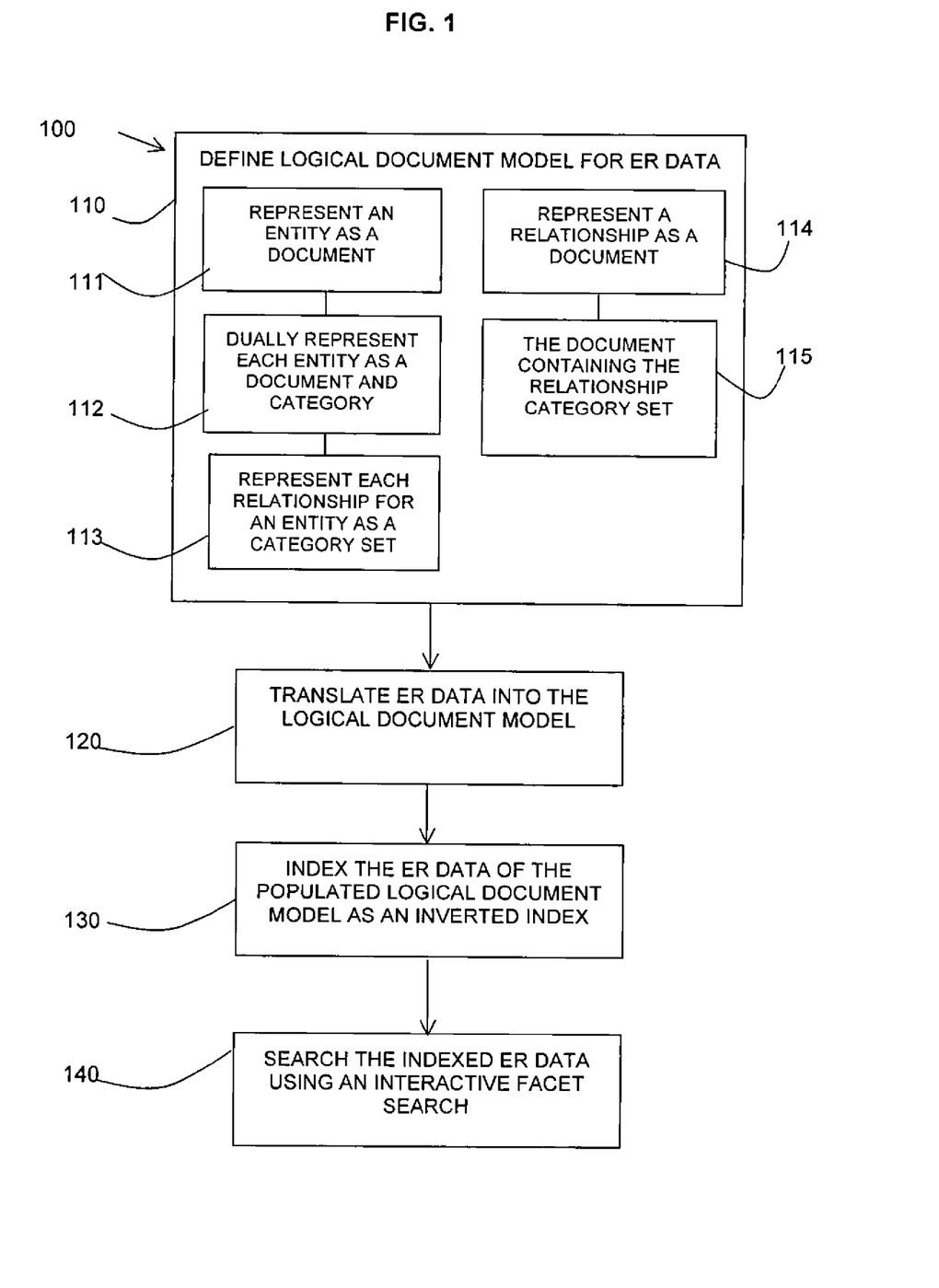
FIG. 1 is a flow diagram of a method in accordance with the present invention.

Referring to FIG. 1, a flow diagram 100 shows an example embodiment of the described method.

A logical document model may be defined 110 for entity-relationship (ER) data. As mentioned above, the ER data may be complex with arbitrary relationship cardinality and rich relationship context. The defined logical document model may include: representing 111 an entity as a document containing the entity's searchable content and metadata; dually representing 112 the entity as a document and as a category of all other entities it relates to; and representing 113 each relationship instance for the entity as a category set that contains categories of all participating entities in the relationship. Representing a relationship as a category set 113 may contain: categories of all participating entities in the relationship; and categories representing all attributes in the relationship; and a category representing the relationship type.

Additionally, defining 110 a logical document model may include: representing 114 a relationship as a document containing the relationship category set 115.

The method may further include translating 120 entity-relationship data into the logical document model to provide a populated logical document model also referred to as an ER graph. The logical document model may or may not include schema definitions.

The method may also include indexing 130 the entity-relationship data of the populated logical document model as an inverted index.

A search may be carried out 140 of the indexed ER data using an interactive facet search as described further below.

Figure 2:
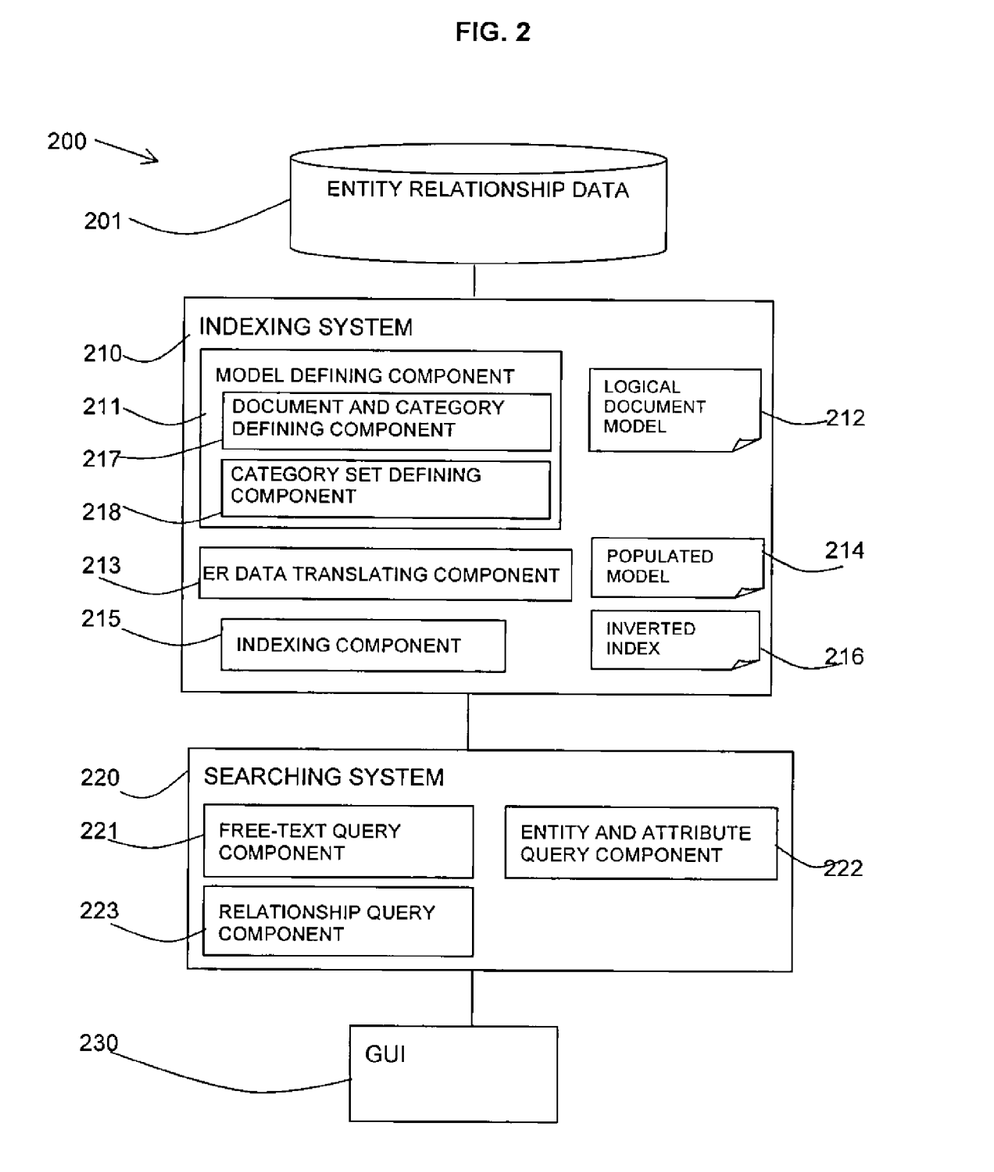
FIG. 2 is a block diagram of a system in accordance with the present invention.

Referring to FIG. 2, an example embodiment of an indexing and searching system 200 is provided.

An indexing system 210 is provided for indexing entity relationship data 201 for searching. The indexing system 210 may include a model defining component 211 for defining a logical document model 212 of ER data 201. The model defining component 211 may include a document and category defining component 217 for defining documents for entities and/or relationships and associated categories. The model defining component 211 may also include a category set defining component 218 for defining category sets for relationships.

The indexing system 210 may also include an ER data translating component 213 for populating the logical document model 212 to provide a populated model 214. The indexing system 210 may also include an indexing component 215 for indexing the populated model 214 as an inverted index 216.

A searching system 220 may be provided for receiving and processing search queries. The searching system 220 may include a free-text query component 221, an entity and attribute query component 222, and a relationship query component 223 for different types of query processing by the searching system 220 using the inverted index 216 based on the logical document model 212.

Figure 6:
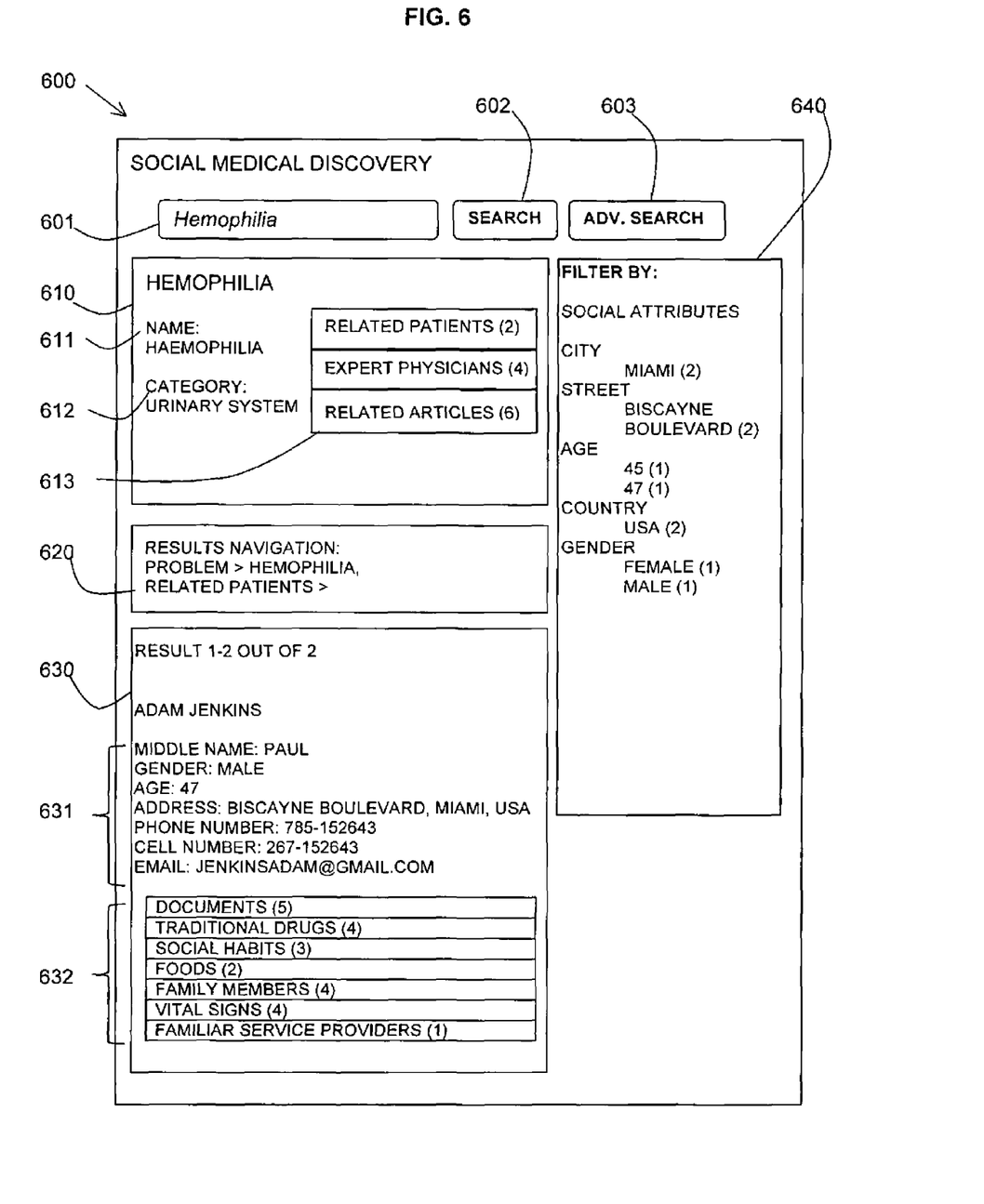
FIG. 6 is a diagram showing a graphical user interface as an example in accordance with the present invention.

User input is received via a graphical user interface 230 which displays query input and results as illustrated further in FIG. 6.

Figure 3:
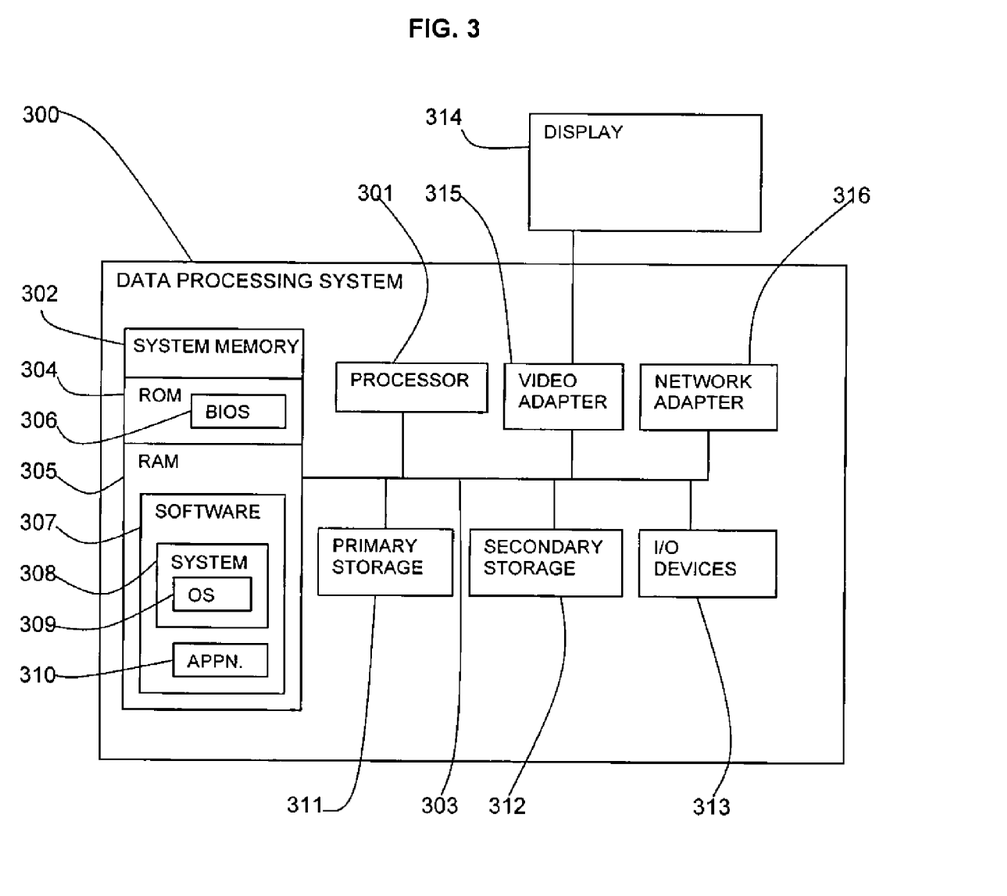
FIG. 3 is a block diagram of a computer system in which the present invention may be implemented.

Referring to FIG. 3, an exemplary system for implementing aspects of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include a primary storage means 311 such as a magnetic hard disk drive and secondary storage means 312 such as a magnetic disc drive and an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers, etc. A display device 314 is also connected to system bus 303 via an interface, such as video adapter 315.

Model

Several model building blocks are now presented of the described entity-relationship indexing and searching system. First, an embodiment of an entity-relationship model is described. Then an embodiment of a query model is described and several example queries shown. Then a description is provided of an embodiment of an interactive query model.

Entity-Relationship Model

The model may be based on a simplified version of a conceptual entity-relationship model. In this model, an entity e may be defined as any object or "thing" that can be uniquely identified and distinguished from other entities. Each entity may have a type e.type used for its classification.

Inheritance of entity types can be defined, where an entity type can have at most single super-type. Therefore, a specific entity type has a list of ancestor types by recursively identifying super-types starting from the given type, until reaching a type that has no super-type. The reverse of this list will be termed the type inheritance path, with the first type in the inheritance type defined the root-type.

Each entity may have a set of one to many attributes e.a used to describe the entity's properties. Each attribute a may have a name a.name, a type a.type (e.g., String, Integer, Date) and a value a.val. An entity's key e.key may be further defined over its attributes, consisting of some minimal attribute subset that can be used to uniquely identify the entity. Each entity must have at least one key.

A relationship r captures an association between two or more entities, termed relationship members. Each relationship may have a type r.type and may be uniquely identified by the combination of its entity member keys, denoted r.key. Each relationship entity member r.e may have a role r.e.role that captures the role this entity "plays" in the association. A relationship may further have zero to many attributes r.a, which can be used to describe its context.

Example

Social-Search ER Model

Figure 4A:
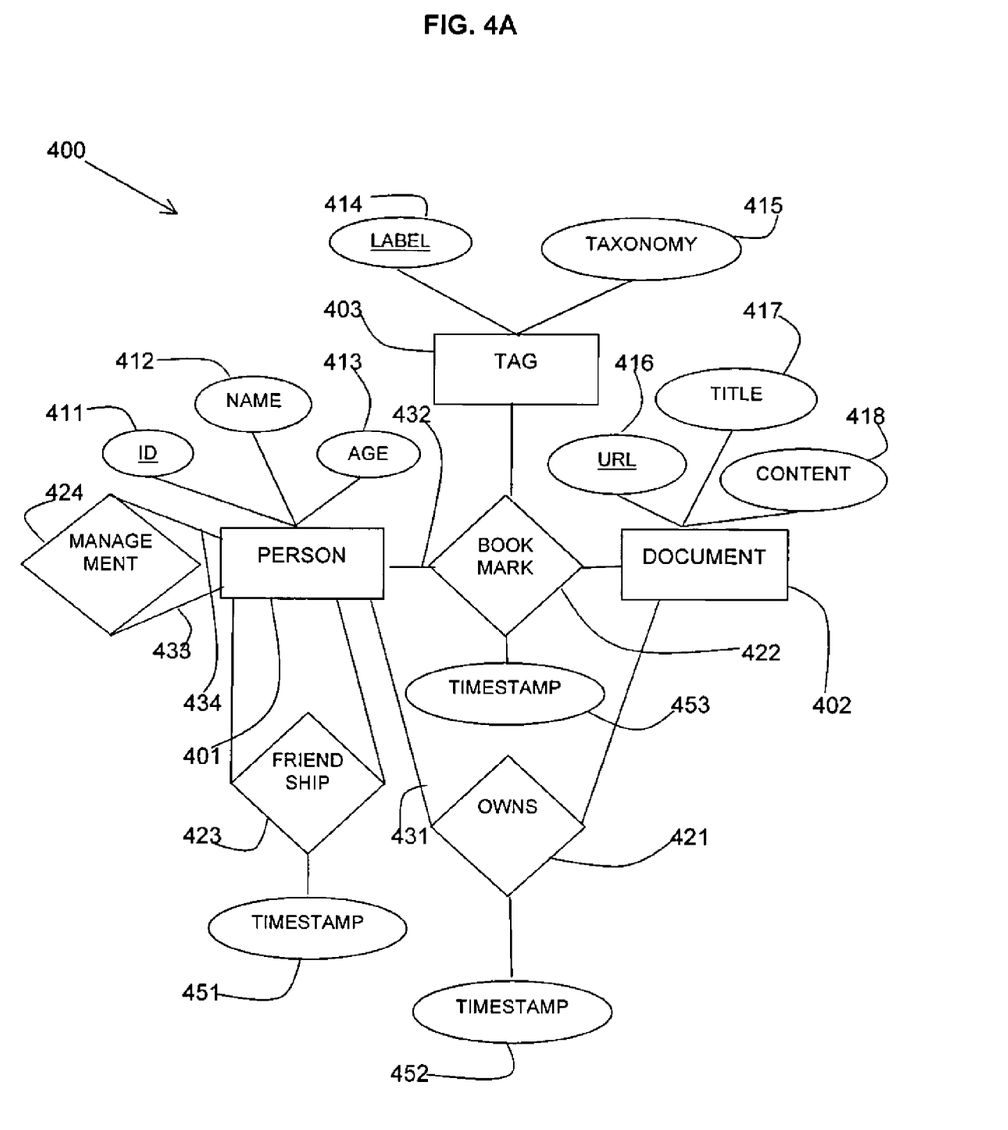
FIGS. 4A and 4B are schematic diagrams illustrating an example in accordance with the present invention.

FIG. 4A illustrates an example entity-relationship model 400 related to the domain of social-search that is used to illustrate the main described concepts. In this model 400, there are three main entity types (shown as rectangles in FIG. 4A), person 401, document 402, and tag 403. Each entity has attributes (shown as ovals in FIG. 4A) that describe it and a key (underlined in the oval). For example, a person 401 may have an id 411 (String) that further serves as its key, a name 412 (String), and an age 413 (Integer) attributes. A tag 403 may have a label 414 (String) that serves as its key, and a taxonomy 415 (String) attributes. A document 402 may have a URL 416 (String) which serves as a key, a title 417 (String), and a content 418 (String).

Relationships (shown as diamonds in FIG. 4A) may link entities. For example, persons 401 can own 421 documents 402 while their authorship role 431 is further kept. Persons 401 may bookmark 422 documents 402 with tags 403, and bookmarks 422 are captured in the model by a ternary relationship that connects the three entity types 401, 402, 403. For a person, his tagger role 432 may also be kept. Each person 401 may have friends captured by the friendship 423 relationship. Finally, the management 424 relationship captures management associations among persons 401, where for each person either her manager 433 or employee 434 role is kept. In addition, timestamp 451, 452, 453 attributes of relationships may be provided.

Query Model

A query over ER data can be used to discover entities based on patterns of interest, either by directly querying entities, their relationships, or both. A query result is a list of entities, possibly of various types, ranked according to their "relevance" to the query. Focus is mainly given to retrieving entities that match the query. For some types of queries that consider text attributes, entities may also be ranked on the textual similarity of their content to the query.

Formally, a query q is a collection of one to many predicates. Each predicate describes some entity pattern, and the result of each predicate is expected to be a set of entities that "match" the specified pattern. Different predicates can be combined using the AND, OR, and NOT logical operators to construct a more complex query predicate. Complex predicates may be bounded with parentheses to denote their scope. Three types of query predicates are supported, namely, entity attribute predicates, free-text predicates, and entity relationship predicates. Each predicate type is now briefly explained accompanied with few examples.

Entity Attribute Predicates

An entity attribute predicate allows entities to be queried based on their type and attributes. The basic form of such predicate is:

entityType.attributeName:attributeValue entityType defines a specific entity type or * for all possible types; attributeName defines a specific attribute name or * for all possible names; attributeValue defines a pattern of the attribute values of interest or * for all possible values. attributeValue can define either a specific value, or a range of possible values denoted as [lowerBound TO upperBound], specifying a lower bound and upper bound (each bound can also be *).

The followings are several examples for entity attribute queries.

Example Query 1

The query predicate Person.*:* (alternatively Person.* or Person.) can be used to return all person entities. A specific person entity may be further returned by using that entity's key; e.g., the query Person.key:12345 will return a single person entity identified by the specified person key.

Example Query 2

Return all person entities whose name is "John" and age is between 20 to 40:
 a. Person.name:"John" AND Person.age:[20 TO 40]

Free-Text Predicates

As already mentioned, issuing structured queries such as the aforementioned entity attribute queries requires some level of knowledge regarding structure. However, such knowledge is usually attained only by system experts, while the majority of users cannot translate the information need into structured queries. Free-text query predicates treat entities as text documents and therefore query the entities' content regardless of their structure. A free-text query predicate may include keywords, phrases, prefixes (e.g., ne*), etc. As an example, the query predicate "CNN News" (or *.*:"CNN News") can be used to return entities that contain this phrase in at least one of their attribute values. (CNN is a trade mark of Cable News Network.) The following example demonstrates how results can be restricted to a specific entity type.

Example Query 3

Return document entities related to "CNN News":
 Document. AND "CNN News"

Relationship Predicates

A relationship query predicate can be used to retrieve entities based on relationships they participate in. For that, a relationship predicate allows to define the entity relationship participation pattern, including the type of relationship, its relationship member patterns and their roles, and relationship attributes that limit the search according to some context. The result of a relationship query predicate is a set of entities that participate in the relationship subject to the relationship specified pattern.

More formally, a relationship predicate is defined by the following expression:

relType((WITH *)|(withExp(AND withExp)*))

relType specifies a specific relationship type or * if any type should be considered. withExp further denotes an expression that takes the form:

WITH(relMemPred|relAttPred)

WITH is a special operator used to describe a single relationship entity member pattern (relMemPred) or relationship attribute (relAttPred) pattern. relMemPred may include any combination of free-text or entity attribute predicates.

The following two queries demonstrate the usage of the WITH expression within a relationship predicate, once based on some relationship attribute, and once based on some relationship member pattern.

Example Query 4

Return entities that participate in some Bookmark relationship with timestamp starting from 1/1/2011:
 Bookmark WITH timestamp:[1/1/2011 TO *])

Example Query 5

Return entities that participate in some Bookmark relationship, with one of its entity members is a tag that contains the keyword "news" as its label.
 Bookmark WITH Tag.label:news It is worth noting that the result of the above query includes entities that are either tags that contain the keyword "news", persons that used such tags, and documents that were bookmarked with such tags. In order to further constrain the query result to a specific entity type, the above relationship predicate should be used in conjunction with a predicate that states the entity type of interest. For example, the following query extension obtains only documents:

Example Query 6

Document. AND (Bookmark WITH Tag.label:news)

Several WITH expressions can be combined together in the query to bind several relationship members and attributes, to form a complex relationship participation pattern.

Example Query 7

Return entities associated with bookmarks that contain the tag "news" with documents that contain the expression "breaking news":

```
Bookmark WITH Tag.label:news AND WITH
Document.content:"breaking news"
```

Relationship members may be further constrained to a specific role in the relationship by using the AS clause.

Example Query 8

Return person entities whose age is 25 or bellow and act as managers:

```
Person.age:[* TO 25] AND (Management WITH *) AND Person. AS
manager
```

Interactive Querying

The rich query model described above is mostly useful for expert users, not for novices. For a user who is not familiar with the query language or the data model, an interactive approach is preferred, where the information need of the user may be gradually covered by a series of query reformulations, starting from the user's original query, based on user selections.

More formally, an interactive query session is a final sequence of query reformulations $q0, q1, \ldots, qk$, where $q0$ is the initial query submitted by the user, $qk$ is the final query, and $qi=\phi(q_{i-1}, R_{i-1}, s_{i-1})$ for each $1 \leq i \leq k$. $\phi$ is a reformulation function, $R_{i-1}$ is the set of entity results obtained by issuing $q_{i-1}$, and $s_{i-1}$ represents the user's selection following the results from step $i-1$.

The described system supports two types of reformulation functions. The first type is query based reformulation, where the new query contains the previous query as a predicate. These reformulations are enabled using an extended faceted-search approach. In the ER model context, possible facets of interest are entity types, relationship types, and attribute names and values. The user selection of a category in the faceted search results adds a constraint to the previous query.

As an illustrative example, lets consider again Query 6. The information need expressed by this query could be equivalently achieved using the following interactive query session having 4 steps:

```
q0 = "news"
s0 = entityType : Tag
q1 = φ(q0, R0, s0) = Tag.*:news
s1 = attributeName : label
q2 = φ(q1,R1,s1) = Tag.label:news
s2 = relType : Bookmark
q3 = φ(q2,R2,s2) = Bookmark WITH Tag.label:news
s3 = entityType : Document
q4 = φ(q3,R3,s3) = Document. AND (Bookmark WITH Tag.label:news)
```

While the previous example results in a conjunctive query, disjunctive queries can be also generated by further allowing users to have multiple facet selections.

The second reformulation type is entity based reformulation, where the user selects a single entity in the result set as a new query. Consider, for example, the following reformulation trail for discovering the manager of "John Doe":

```
q0 = "John Doe"
R0 contains Person entity e_m with name "John Doe"

s0 = e_m,relType : Management
q1 = φ(q0,R0,s0) = Management WITH Person.key:12345
s1 = relationshipRole : manager
q2 = φ(q1,R1,s1) = (Management WITH Person.key:12345)
                   AND Person. AS manager
```

Implementation

In this section, example implementation details of the described ER indexing and searching system are provided. First, a logical document model is defined, and it is shown how entity-relationship data is translated into this model. An inverted index implementation of the logical document model is then described, and how the different query types presented above can be evaluated using this implementation.

Logical Document Model

An example embodiment of a logical document model is described and used in the next section for representing entity-relationship data. The described logical document model consists of four main building blocks, namely, Documents, Fields, Categories, and Category sets. Each entity in the model is represented by a document while its attributes are represented by the document's fields. In addition, each entity is represented as a category of all entities it relates to. Thus, the document's categories represent all entities which are related to the corresponding entity with at least one relationship. Any relationship in which the entity participates is represented by a category set that contains all categories of participating entities. This dual representation allows efficient search for entities, either through their attributes as well as through their relationships with others, as shown in the following.

Figure 4B:
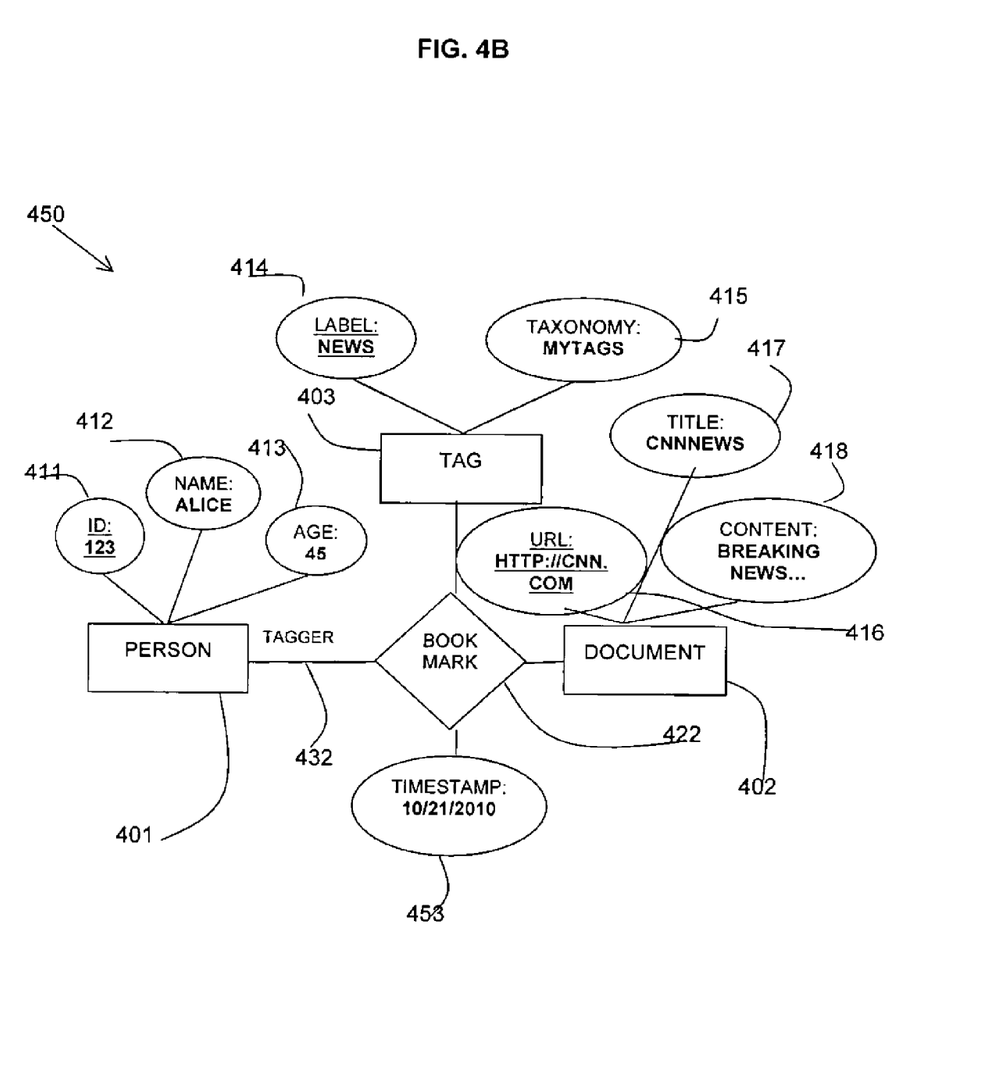

Referring to FIG. 4B, an example extract 450 of the ER model of FIG. 4A is shown of a relationship (the bookmark relationship) with corresponding. Specific examples are shown of the attributes.

Table 1, shows a logical document extract representing a person entity.

TABLE 1

| id | 1 |
|---|---|
| $F_e$ | $f_{key}$ = (key, 123) |
| | $f_{type}$ = (type, Person) |
| | $f_{a1}$ = (Person\|id, "123", String) |
| | $f_{a2}$ = (Person\|name, "Alice", String) |
| | $f_{a3}$ = (Person\|age, 45, Integer) |
| | $f_{a1.name}$ = (attribute, id) |
| | $f_{a2.name}$ = (attribute, name) |
| | $f_{a3.name}$ = (attribute, age) |
| | $f_{content}$ = (content, "Alice. 45") |
| | $f_{ce}$ = (entity, key, entity/Person/123) |
| $C_e$ | $c_1$ = entity/Person/123 |
| | $c_2$ = Integer/age/45 |
| | $c_3$ = relationship/Bookmark |
| | $c_4$ = Date/timestamp/2010.10.21 |
| $CS_e$ | $cs_1$ = {($c_1$, tagger), entity/Document/cnn.com, entity/Tag/news, $c_3$, $c_4$} |

Formally, a document d is defined by a quartet (id, $F_d$, $C_d$, $CS_d$); id is a unique document identifier; $F_d$ is a collection of fields—each field $f \in F_d$ is defined by a triplet (name, value, payload). $C_d$ is a set of categories used to categorize the document. Each category $c \in C_d$ is defined by a path consisting a sequence of nodes $c=v_1/v_2/\ldots/v_l$ in the system taxonomy T. Finally, $CS_d$ is a collection of category-sets, where each category-set cs $\in CS_d$ is defined by a set of pairs cs={(c,payload)|c ∈T}. The payload of a field or a category in a category-set is optional and not always required. In such cases, it may be excluded from the object's description.

Above it is mentioned that category sets are attached to documents of entities from the relationship, a further option is to create a document for a relationship which contains only the category set. Tables 2 and 3 shows two logical document extracts representing a person entity and bookmark relationship, respectively.

TABLE 2

| Id | 1 |
|---|---|
| $F_e$ | $f_{key}$ = (key, 123) |
| | $f_{type}$ = (type, Person) |
| | $f_{a1}$ = (Person|id, "123", String) |
| | $f_{a2}$ = (Person|name, "Alice", String) |
| | $f_{a3}$ = (Person|age, 45, Integer) |
| | $f_{a1.name}$ = (attribute, id) |
| | $f_{a2.name}$ = (attribute, name) |
| | $f_{a3.name}$ = (attribute, age) |
| | $f_{content}$ = (content, "Alice. 45") |
| | $f_{ce}$ = (entity, key, entity/Person/123) |
| $C_e$ | $c_1$ = entity/Person/123 |
| | $c_2$ = Integer/age/45 |
| | $c_3$ = relationship/Bookmark |
| | $c_4$ = Date/timestamp/2010.10.21 |
| $CS_e$ | |

TABLE 3

| Id | 2 |
|---|---|
| $F_r$ | $f_{key}$ = (key, 456) |
| $C_r$ | |
| $CS_r$ | $cs_1$ = {($c_1$, tagger), entity/Document/cnn.com, entity/Tag/news, $c_3$, $c_4$} |

ER Data Representation

It is now described how entity-relationship data is represented in the logical document model. To illustrate this representation, an example of a Bookmark relationship instance with its entity members is given, together with a detailed example of the document constructed for the Person entity.

Entities

An entity e is represented by a document $d_e$, with $F_e$ containing the following fields: 1) $f_{key}$=(key,e.key) for the entity's key; 2) $f_{type}$=(type,e.type) for the entity's type; 3) $f_a$=(e.type\a.name, a.value, a.type), for each of the entity's attributes e.a; 4) $f_{a.name}$=(attribute, a.name), for each of the entity's attributes.

Additionally, to efficiently support free-text queries, a special field $f_{content}$=(content,text), is added to $d_e$. The text value of this field is the concatenation of all attribute values represented as string literals. Some attributes may contain data which is irrelevant for free text search (e.g. the entity id). Therefore, the model allows defining for each attribute whether its string representation should be available for free-text search, and the text value of $f_{content}$ concatenates only those attributes' values. In FIG. 3, the searchable content contains the person's name and age, and not the person's id.

As mentioned above, each entity e is represented as a category in the system taxonomy, with $c_e$=entity/e.type/e.key as its path. In order to provide a mapping from $d_e$ (the document representation of e) to $c_e$ (its category representation), a special field $f_{ce}$=(entity, key, $c_e$) is added to $F_e$.

$C_e$ includes categories which allow later on to perform faceted-search based on the entity type and attributes. Similarly to searchable attributes, one can decide which attributes worth also exposing as facets, representing attribute a as $c_a$=a.type/a.name/a.value. The entity type and the person's age are further kept as categories.

Above, an attribute is added to the taxonomy as attributeType/attributeName/attributeValue. However, for numeric attributes this representation means significant increase in the taxonomy size, and for large data with many numeric attributes the taxonomy might be overloaded. For that reason, the representation of numeric attributes may be changed to be a combination of a category and payload. That is, the category representing the attribute is attributeType/attributeName, and when it is added to a document (either in Ce or in CSe), the attribute value is added as the category payload.

Relationships

A relationship r is represented as a category-set $cs_r$ that includes the categories of all relationship members. More specifically, for each relationship entity member r.e with role r.e.role, the pair ($c_{r.e}$,r.e.role) is added to $cs_r$. The category $c_{r.type}$=relationship/r.type is also added to $cs_r$, to represent the relationship type r.type. As relationships can contain attributes, each relationship attribute r.a is represented by a category $c_{r.a}$ (defined the same as attribute categories for entities defined above) which is added to $cs_r$. In order to record relationship r for each of its entity members r.e, $cs_r$ is added to $CS_e$.

As already mentioned, $C_e$ includes all categories required for supporting faceted navigation, either through the relationship type, related entities, or relationship attributes. Therefore, the categories of the relationship type and the bookmark timestamp attribute are further added to $C_e$.

Inverted Index Implementation

The described logical document model implementation is based on a faceted search library developed on top of Apache Lucene (see http://lucene.apache.org) (Apache Lucene is a trade mark of Apache Software Foundation). Apache Lucene is a free/open source information retrieval software library. At the core of Lucene's logical architecture is the idea of a document containing fields of text. This flexibility allows Lucene's API to be independent of the file format.

Lucene's logical document model supports multi-field documents, i.e. (id,$F_d$). Faceted search is further supported by assigning an ordinal with every category in the taxonomy. To allow efficient facet navigation using drill-down, for each category c ∈ $C_d$ a special field (categories, c) is added to the document. An additional special field is kept for each document, containing the ordinals of all categories in $C_d$. This special field is used for mapping documents to their associated categories, for efficient facet aggregation of documents that include categories of interest.

The index and search is extended to support category sets by adding one more special field which is used to map documents to their category sets. Furthermore, for each field that represents a category, a payload is added that contains the identifiers of all category sets that include this category. Similarly to the efficient facet aggregation over independent categories, these extensions now allow efficient facet aggregation over arbitrary subsets of category sets.

Table 4 shows an inverted index representing the person entity and bookmark relationship from Tables 2 and 3.

TABLE 4

| Term (field, value) | Occurrences (document Id, position, payload) |
|---|---|
| (attribute, age) | (1, 1, nil) |
| (attribute, id) | (1, 1, nil) |
| (attribute, name) | (1, 1, nil) |

TABLE 4-continued

| Term (field, value) | Occurrences (document Id, position, payload) |
| --- | --- |
| (categories, list) | (1, 1, {entity/Person/123, Integer/age/45, relationship/Bookmark, Date/timestamp/2010.10.21}) |
| (category, sets) | (2, 1, {{(entity/Person/123, tagger), relationship/Bookmark, Date/timestamp/2010.10.21, entity/Document/cnn.com, entity/Tag/news}}) |
| (content, Alice) | (1, 1, nil) |
| (content, 45) | (1, 6, nil) |
| (entity, key) | (1, 1, entity/Person/123) |
| (key, 123) | (1, 1, nil) |
| (key, 456) | (2, 1, nil) |
| (Person\|age, 45) | (1, 1, nil) |
| (Person\|id, "123") | (1, 1, nil) |
| (Person\|name, "Alice") | (1, 1, nil) |
| (type, Person) | (1, 1, nil) |

Besides an efficient implementation of faceted search, the usage of Lucene offers a few additional important features. First, in Lucene's query API, each query is evaluated against a single field, allowing different runtime treatment to different fields. In addition, Lucene supports efficient numeric range queries over numeric fields. Another important feature is the Lucene query syntax, which allows advanced text search features such as Boolean, phrase, proximity, wildcard, and other advanced query types.

Query Processing

In this section, the runtime process of each of the query types presented above is described. Since an entity e has two representations ($d_e$ and $c_e$), the set of entities which comply with a query can be generated either as a list of documents or as a list of categories. The transition from one representation to the other can be efficiently performed using $f_{ce}$ and $f_{key}$.

Most of the query processing described next is done using Lucene's Term Query, which accepts a term containing field name and a query term, and efficiently retrieves all documents in which this term appears in the context of the given field.

Free-Text Queries

Free-text queries are issued by applying Lucene's free-text search over the field $f_{content}$ which encapsulates all searchable content of the entities.

Entity and Attribute Queries

When searching for entities of a specific type, only entity type is queried. The query is evaluated using the term query (type,e.type). Thus, all entities of that type will be retrieved. When both entity type and attribute name and value are queried, i.e. looking for entities of a certain type type with a specific attribute a, the term query (type|a.name, a.value) is issued. If there is no constraint on the entity type, then, for each entity type in the system that includes the attribute a.name, a term query is created with this type and the given attribute as described above, and these term queries are combined into a Boolean OR query.

A special treatment is needed for queries which contain only attribute name. Such queries are evaluated using the term query (attribute, a.name).

Relationship Queries

Recall that a relationship query predicate allows to query entities based on their relationship participation pattern, including the relationship type, entity members whom they participate with, or relationship attributes that constrain the relationship context. This is done by binding the relationship type r.type with one or more WITH predicates. For example, looking back at Query 7, the constraints are on the relationship type r.type=Bookmark, a WITH predicate that constrains the relationship to include a Tag entity labeled with "news", and a WITH predicate that further constrains the relationship to include a Document entity having the "breaking news" expression within its content.

Note that while a candidate entity may satisfy all the relationship predicates, this does not imply that it also satisfies the relationship query. This may happen when the candidate entity document includes categories of relationship member entities (or attributes) that independently satisfy all predicates, while none of these categories actually appear together within some category set that represent a specific relationship instance. For example, a person that tagged a document containing "breaking news" with "report", and also tagged another document with the tag "news", satisfies all predicates of Query 7; however, it does not satisfy the query. Therefore, each candidate needs to be examined based on additional validation of its corresponding category sets.

This may start with evaluating each WITH predicate, and transforming each matching entity or attribute to its corresponding category. All categories are collected that match a predicate into a collection termed predicate categories collection. Next, for each predicate, all category sets are collected that contain at least one category within its predicate categories collection. This collection is termed the predicate category sets collection. A category set then satisfies the relationship query if it contains $C_{r.type}$ and is included in every predicate category sets collection.

The final result of the process is a list of category sets that satisfy the relationship query. The entities which take part in each of these category sets are obtained using the category to entity mapping, and are reported as the query results.

Entity Inheritance Support

A further aspect of entity inheritance support is now described. In the taxonomy, entity type inheritance is implemented by using the inheritance path described above. For example, a system is described where Person is an entity type and Employee and Client are two sub-types of Person. Therefore the inheritance path for Person is "Person", for Employee is "Person Employee", and for Client is "Person Client". The category representing Person p1 will be Person/P1. The category representing employee p2 will be Person/Employee/p2, and the category representing employee p3 will be Person/Client/p3. That way, when creating a facet with category Person as the root, it will return all relevant Person entities including employees and clients, whereas creating a facet with category Employee will return all relevant employees but not clients and persons that are neither employees nor clients.

Indexing and Retrieval of Documents with Inheritance Metadata

Figure 5:
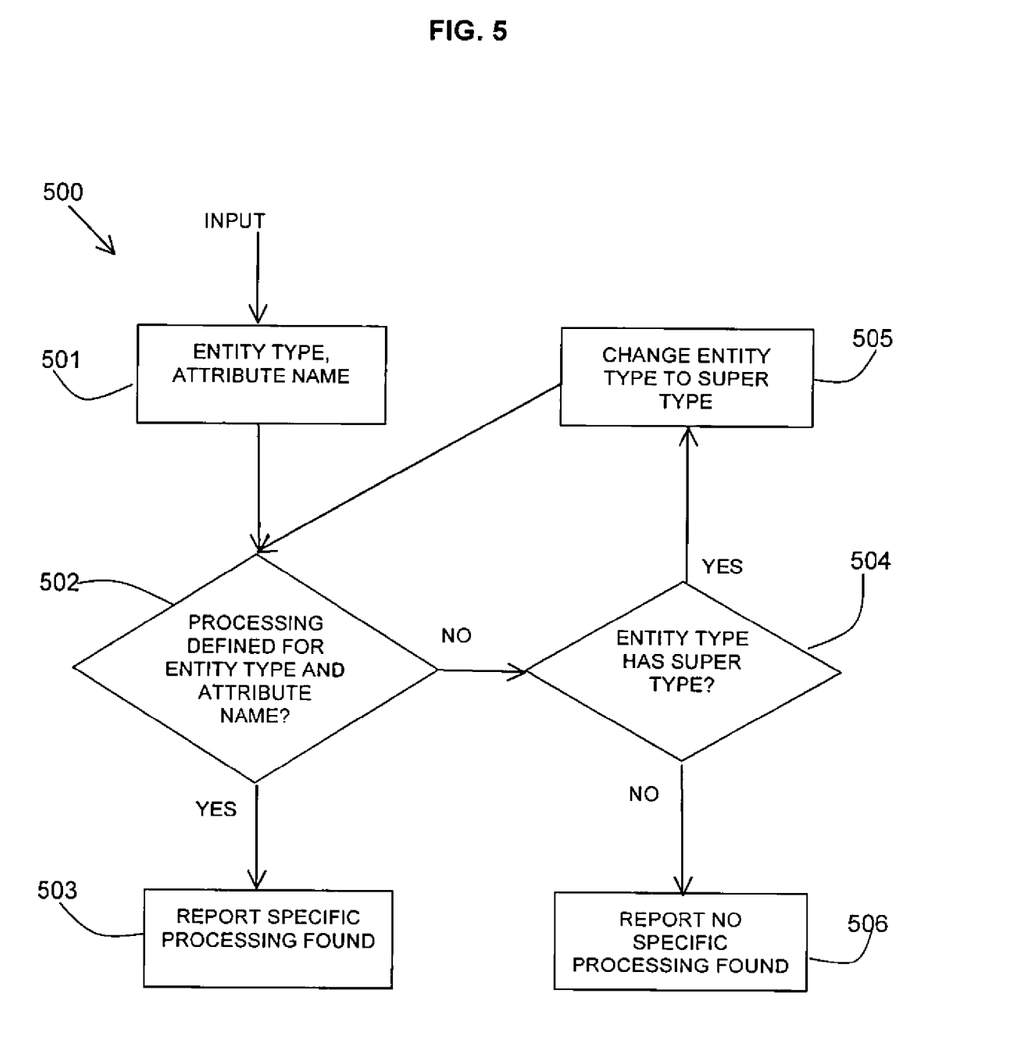
FIG. 5 is a flow diagram of an aspect of the method in accordance with the present invention.

Another aspect affected by inheritance definitions is processing of attribute content. It is possible to define special processing of attribute value for a combination of entity type and attribute name. Referring to FIG. 5, a flow diagram 500 shows given an entity type and attribute name 501 as an input, identification of the proper processing of attribute value involves entity type inheritance as follows. It may be determined 502 if the entity type and attribute name have processing definitions, if so this processing may be applied and it may be reported 503 that the specific processing has been found. If the entity type and attribute name do not have processing definitions, it may be determined 504 if the entity has a super type. If so, the super type may be used recursively to check for processing definition, by changing 505 the entity type to the super type. This may continue until processing definitions are located or failing to locate such definitions for the root type. If the entity type does not have a super type, it may be reported 506 that no specific processing was found.

A field-oriented document model may be assumed (similar to Lucene's document model), where documents are made of a set of fields, each field has a name and some value.

Let T denote an entity type. For each entity type T and attribute name a_n, let A(T.a_n)={a1,a2, . . . } denote a set of text analysis rules that should be performed on attributes with name a of entities of type T. For example: A(T,a_n)={stemming, white-space tokenization, hyphen-removal,boost(2)} instructs the text processing system to perform stemming, whitespace tokenization, hyphens removal, and boosting with value 2 on attribute a values which belongs to entities of type T. In any other case where no text analysis rules are associated with some field f, it is assumed to be processed using the rules of a default entity type, denoted A(default.*).

For each entity type T and attribute name a, let S(T.a_n)={s1, s2, . . . } denote a set of document summarization rules that should be performed on attributes with name a of entities of type T. For example: S(T,a_n)={html highlight, 3 fragments} instructs the document summarizer to summarize this entity's attribute a's value using no more than 3 best matching text fragments and use html highligher (e.g., <span class='highlight'>this is a match</span>) for highlighting the matching attribute. In any other case where no document summarization rules are associated with some field T.a_n, it is assumed it's document summarization is done using the summarizer of a default entity type, denoted S(default).

Let T'=ancestor(T) be an inheritance relationship between entity type T and entity type T'. This means that every attribute defined for entity type T' is also defined for entity type T, and that entity type T may further define new attributes.

Let T'=super(T) denote the operator that given some entity type T returns either its super-type or NIL (if T has no super-type).

Entity types that extend some other entity type may further extend the text analysis or summarization rules of their parent, i.e., rules may be removed, added. This in turn, provides the ability to define text analysis and summarization rules which utilize parents existing rules, add new ones, or overwrite existing ones.

The following are descriptions of three document processing steps during a given document life cycle which utilize possible document inheritance metadata during indexing and retrieval.

Indexing:

```
Let e be an entity of type T to be indexed.
For each attribute a (with name a_n and value a_v) of entity e do {
    boolean done = false
    T' = T
    while T' != NIL {
        if A(T.a_n) != NIL{
            do index field f with name T'.a_n and value result of
                processing a_nusing analysis rules
A(T'.a_n)
            done = true
        }
        else {
            T' = parentOf(T')//move one more step in the
            inheritance hierarchy
        }
    }
    //no text analysis rules were found
    if done = false
        do index field f with name T.a_n and process its value using
            analysis rules A(default)
}
```

Search:

Let a be an attribute name to be searched over (i.e., given from the query parser) and T(a) be the set of entity types that include such attribute. Entity types are ordered in T(f) according to their inheritance ordinal.

```
For each entity type T in T(f) {
    boolean done = false
    T' = T
    while done = false
    {
        if A(T'.a_n) != NIL {//use T'.a_n text analysis rules
            use text analysis A(T'.a_n) rules for processing the query
                over predicate T'.a_n and
            include this predicate in the query disjunction.
            //we need to remove possible ancestors redundant
                definitions
            T' = parentOf(T')
            while T' != NIL {
                remove T' from T(f)
                T' = parentOf(T')
            }
            done = true
        }
        else T' = parentOf(T')//move one more step in the
            inheritance hierarchy
    }
    if done = false
        use text analysis A(default) rules for processing the query
            over predicate T.a_n and
    include this predicate in the query disjunction.
}
```

As an example suppose that entity type T1 extends entity type T2, with A(T1.a1_n)!=NIL and A(T1.a2_n)=NIL and A(T1.a3_n)=NIL and A(T2.a1_n)!=NIL and A(T2.a2_n)!=NIL then:

I. query: T1.a1→use A(T1.a1_n) and use original query predicate T1.a1

II. query: T1.a2→use A(T2.a2_n) and rewrite query to T2.a2

III. query: *.a1→use A(T1.a1_n) and rewrite query to (T1.a1_n OR T2.a1_n)

Document Summarization:

Let a be a field to be searched over (i.e., given from the query parser) and T(a) be the set of entity types that include such attribute.

```
For each attribute a in relevant document d {
    T = entity type of d
    boolean done = false
    while done = false{
        if a value match under text analysis rules A(T.a_n){
            apply summarization rules S(T.a) on d.a
            done = true
        }
        else T = parentOf(T)//move one more step in the inheritance
            hierarchy
    }
    if done = false and a value match under text analysis rules
    A(default)
        apply summarization rules S(default) on d.a
}
```

Referring to FIG. 6, an example graphical user interface 600 for an embodiment of the described search system is shown demonstrating discovery usage of the system.

The GUI 600 is shown for the field of social medical discovery with a search application in the healthcare domain. Users may initiate an exploratory session by submitting a (free-text or structured) query 601 and activating a search 602 or imputing advanced search settings 603.

A search result 610 may be displayed with initial details, for example, the name 611 and category 612. Links 613 may be provided to entities related to the query result. In this example, links 613 are provided to "Related patients (2)", "Expert physicians (4)" and "Related articles (6)". In this example, the user has followed the results navigation 620 to the link "Related patients".

Two patients are returned as relevant to the initial query "Hemophilia" submitted by a user, who later on followed the "Related patients" link to discover related patients to the query. The first of the patient results 630 are shown with the patient attributes 631 and the system exposes several facets as well as other entities 632 related to those patients. For each patient the user may further restrict the search to a specific facet, or follow relationship links to explore other related entities.

The user may follow a specific attributes 640 of retrieved entities (shown in the Filter by: column) or one of their related entities 632 (given within the patient's record).

An indexing and search system may be provided as a service to a customer over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for indexing and searching entity-relationship data performed by a computerized device having a processor, comprising:
providing a database of entity-relationship data which includes identifiers of entities and indications of relationships between the entities, indicating which entities are related to each other;
representing the entities of the provided database as respective documents, each document containing content and metadata of a respective entity;
representing the entities of the provided database as respective categories;
representing each relationship instance, which indicates a relationship between a plurality of entities, in the database, as a category set that contains categories of all participating entities in the relationship; and
indexing the entity-relationship data of a populated logical document model as an inverted index, which indicates for each relationship attribute, the entities to which it relates, allowing lookup in the inverted index of results of queries based on relationship participation patterns.

2. The computer-implemented method of claim 1, wherein defining a logical document model for entity-relationship data includes representing a relationship between a plurality of entities as a category set that contains:
categories of all participating entities in the relationship; and
categories representing all attributes in the relationship; and
a category representing the relationship type.

3. The computer-implemented method of claim 1, wherein defining a logical document model for entity-relationship data includes representing a relationship between a plurality of entities as a document containing the relationship category set.

4. The computer-implemented method of claim 1, wherein defining a logical document model for entity-relationship data includes inclusion of a relationship category set in documents representing entities participating in the relationship.

5. The computer-implemented method of claim 1, wherein the entity-relationship data that can be indexed includes multiple entities, wherein each entity has none to multiple relationships, and a relationship is an association between two or more entities.

6. The computer-implemented method of claim 1, wherein the entity-relationship data that can be indexed includes: entity data with multiple attributes of various data types, relationship data with arbitrary cardinality, and attributes on relationships denoting relationship context.

7. The computer-implemented method of claim 1, including: searching indexed entity-relationship data using a faceted search, wherein the categories are all categories required for supporting faceted navigation.

8. The computer-implemented method of claim 1, wherein the logical document model defines fields for a document including one or more of the group of: a key, a type, attributes, attribute names, free-text content of the entity or relationship for searching.

9. The computer-implemented method of claim 1, wherein the logical document model defines categories of attributes to be exposed as facets for searching.

10. The computer-implemented method of claim 1, wherein the logical document model includes for each field that represents a category, a payload that contains the identifiers of all category sets that include this category.

11. The computer-implemented method of claim 1, including:
obtaining a set of entities which comply with a query as a list of documents or as a list of categories with transition from one representation to the other performed using the fields in the logical document model.

12. The computer-implemented method of claim 1, including:
processing a free-text query by searching over a free-text content field encapsulating the searchable content of the entities.

13. The computer-implemented method of claim 1, including:
processing entity and attribute queries by retrieving matching entity and/or attributes from the inverted index.

14. The computer-implemented method of claim 1, including:
processing relationship queries by retrieving for each predicate in the query a list of categories which comply with the predicate, and then identifying category sets which contain for each predicate at least one category complying to the predicate.

15. The computer-implemented method of claim 1, including:
receiving a user query, by the processor;
providing by the processor a result set for the query;
receiving user input, via a graphical user interface, of related entities using a relationship facet, and
refining the user query to reflect the received user input, using structured query predicates.

16. The computer-implemented method of claim 1, including:
indexing and retrieval of documents with inheritance metadata, where the category representing an entity contains entity type inheritance information, and where type-specific processing of attributes is applied also for entities to which the type is a super-type.

17. A computer program product for indexing and searching entity-relationship data, the computer program product comprising:
a computer readable non-transitory storage medium having computer readable program code embodied therewith, the computer readable program code comprising:
computer readable program code configured to:
access a database of entity-relationship data which includes identifiers of entities and indications of relationships between the entities, indicating which entities are related to each other;
represent the entities of the provided database as respective documents, each document containing content and metadata of a respective entity;
represent the entities of the provided database as respective categories;
represent each relationship instance, which indicates a relationship between a plurality of entities, in the database, as a category set that contains categories of all participating entities in the relationship; and
index the entity-relationship data of a populated logical document model as an inverted index.

18. A system for indexing and searching entity-relationship data, comprising:

a processor configured to:
receive indication of a database of entity-relationship data which includes identifiers of entities and indications of relationships between the entities, indicating which entities are related to each other;
represent the entities of the indicated database as respective documents, each document containing content and metadata of a respective entity;
represent the entities of the provided database as respective categories;
represent each relationship instance, which indicates a relationship between a plurality of entities, in the database, as a category set that contains categories of all participating entities in the relationship; and
index the entity-relationship data of a populated logical document model as an inverted index.

19. The system of claim 18, including:
a searching system for obtaining a set of entities which comply with a query as a list of documents or as a list of categories with transition from one representation to the other performed using the fields in the logical document model.

20. The system of claim 18, including:
a free-text query component for processing a free-text query by searching over a free-text content field encapsulating the searchable content of the entities.

21. The system of claim 18, including:
an entity and attribute query component for processing entity and attribute queries by retrieving matching entity and/or attributes from the inverted index.

22. The system of claim 18, including:
a relationship query component for processing relationship queries.

23. The system of claim 18, including:
a graphical user interface for receiving user input of related entities using a relationship facet, refining user query to reflect choice using structured query predicates.

24. The system of claim 18, wherein the processor is configured to index documents with inheritance metadata.

25. A method of providing a service to a customer over a network for access control for indexing and searching entity-relationship data, the service comprising:
providing a database of entity-relationship data which includes identifiers of entities and indications of relationships between the entities, indicating which entities are related to each other;
representing the entities of the provided database as respective documents, each document containing content and metadata of a respective entity;
representing the entities of the provided database as respective categories;
representing each relationship instance, which indicates a relationship between a plurality of entities, in the database, as a category set that contains categories of all participating entities in the relationship; and
indexing the entity-relationship data of a populated logical document model as an inverted index.

* * * * *